United States Patent [19]

Osterman

[11] Patent Number: 5,935,211
[45] Date of Patent: Aug. 10, 1999

[54] DISTRIBUTED NOTIFICATION

[75] Inventor: Lawrence William Osterman, Woodinville, Wash.

[73] Assignee: Microsoft Corporation, Redmond, Wash.

[21] Appl. No.: 08/678,629

[22] Filed: Jul. 10, 1996

[51] Int. Cl.[6] .............................. G06F 13/38; G06F 15/17
[52] U.S. Cl. ......................... 709/228; 709/237; 709/300; 709/304
[58] Field of Search ............................... 395/200.67, 680, 395/684, 200.36, 200.33, 200.57, 200.58; 364/242.94; 340/825.08

[56] References Cited

U.S. PATENT DOCUMENTS

| | | | |
|---|---|---|---|
| 4,688,170 | 8/1987 | Waite et al. | 364/200 |
| 5,164,985 | 11/1992 | Nyset et al. | 380/9 |
| 5,218,699 | 6/1993 | Brandle et al. | 395/650 |
| 5,247,676 | 9/1993 | Ozur et al. | 395/650 |
| 5,283,856 | 2/1994 | Gross et al. | 395/51 |
| 5,430,876 | 7/1995 | Schreiber et al. | 395/650 |
| 5,442,749 | 8/1995 | Northcutt et al. | 395/200.09 |
| 5,499,343 | 3/1996 | Pettus | 395/200.2 |
| 5,682,534 | 10/1997 | Karpoor | 395/684 |

OTHER PUBLICATIONS

Kramer, Matt, "Baranof's MailCheck 2.6 Delivers Improved Tools", PC Week, Sep. 11, 1995, Ziff–Davis Publishing Company 1995.

Frenkel, Gary, "cc:Mail View Keeps an Eye on Your Messaging System", Network Computing, Jun. 1, 1995, CMP Publications, Inc., 1995.

John Shirley et al., Microsoft RPC Programming Guide, Mar. 1995, O'Reilly & Associates, Inc., Sebastopol, California.

*Primary Examiner*—Mark H. Rinehart
*Attorney, Agent, or Firm*—Workman, Nydegger & Seeley

[57] ABSTRACT

A computer-implemented method uses out-of-band notifications to reduce overhead associated with notifying a client process of events that have occurred at a server process in a computer system employing a request-response protocol. Initially, a notification transmission connection is established between the client process and the server process using the request-response protocol. Thereafter, notifications are transmitted from the client process to the server process using the connection, and without using the request-response protocol to transmit the notifications.

12 Claims, 7 Drawing Sheets

DISTRIBUTED NOTIFICATION

BACKGROUND OF THE INVENTION

The invention is directed to computing systems in which a client process communicates with a server process.

A computing system may include a client computer that communicates with a server computer over a network. In such a system, referred to as a distributed computing system, a client process (i.e., a process running on the client computer) causes a server process (i.e., a process running on the server computer) to perform an operation by sending a request to the server process over the network. The server process responds by performing the operation and returning any resulting data to the client process over the network. A system in which a client process makes requests to which a server process responds may be referred to as operating according to a request-response protocol.

Exchanges of requests and responses between the client and server processes may be made using the Remote Procedure Call ("RPC") protocol. The RPC protocol is discussed, for example, in "Microsoft RPC Programming Guide", John Shirley and Ward Rosenberry, O'Reilly & Associates, Inc., Sebastopol, Calif., 1995, which is incorporated herein by reference.

The RPC protocol permits the client process to communicate with the server process by making a procedure call to the server process. RPC software running on the client computer automatically transmits the procedure call to the server computer. RPC software running on the server computer receives the procedure call and initiates a response by the server process. The RPC software then returns the results to the client computer.

Request-response protocols such as the RPC protocol provide security features and other mechanisms to ensure data integrity. For this reason, electronic mail and other applications that are sensitive to data integrity and security may use a request-response protocol for communication between a server process and client processes. In applications such as electronic mail systems, the server process may support a large number of client processes.

SUMMARY OF THE INVENTION

When a server process supports a large number of client processes, a significant portion of the resources of the server process may be expended in providing status information to the client processes. For example, each client process in an electronic mail system may periodically poll the server process to determine whether the server process has received new mail for the client process or needs to provide the client process with other information. The polling frequency must be set to a value that does not excessively burden the server process and that provides the client processes with satisfactory responsiveness.

Excessive polling can place a considerable burden on the server process. For example, the POP3 network protocol, which is used by most internet electronic mail systems, requires four separate request-response protocol exchanges for a client process to poll a server process: a USER exchange to identify the user, a PASSWORD exchange to verify the user's identity, a STAT or LIST exchange to determine if there is new mail, and a QUIT exchange to terminate the connection if there is no new mail for the client process. A server process that is connected to 1000 mailboxes (client processes) that each poll once per minute will receive 4000 requests each minute, or 240,000 requests each hour. If the average mailbox receives ten messages in an eight hour business day, this means that only ten of the 480 polls produced by each client process are effective. This is a significant waste of the server's resources. However, reducing the polling frequency generates another problem in that such a reduction also reduces the responsiveness of the system.

A computer-implemented technique uses asynchronous, out-of-band notifications to reduce overhead associated with notifying a client process of events that have occurred at a server process in a computer system employing a request-response protocol. The technique permits efficient notification from a server process when a client process and the server process normally communicate using a request-response protocol such as the RPC protocol. Initially, the request-response protocol is used to establish a notification connection between the client process and the server process. Thereafter, the server process sends notifications to the client process using the connection and without using the request-response protocol. The client process responds to the notification by requesting data corresponding to the notification using the request-response protocol.

The server process may use a datagram protocol to transmit notifications to the client process. Datagram protocols permit a data source to transmit messages (i.e., datagrams) to an addressee without establishing a two-way connection to the addressee and without requiring confirmation of receipt by the addressee. Datagram protocols have much lower overhead than request-response protocols. However, unlike request-response protocols, datagram protocols do not guarantee that an addressee will receive a particular datagram. Nor do datagram protocols provide a mechanism for an addressee to verify the source of a particular datagram.

Since receipt of a datagram is not guaranteed, the client process continues to poll the server process periodically. However, the client process assumes that the datagram protocol is somewhat reliable and reduces the polling frequency based on this assumption.

Since the source of a datagram may not be verified readily, the client process does not rely on data included in the datagram (and the server process does not place meaningful data in the datagram). Instead, the client process uses the datagram as an indication that the client process should use the request-response protocol to poll the server process and obtain data from the server process using the request-response protocol.

The technique permits efficient notification without sacrificing the security features and other benefits provided by the RPC protocol or similar request-response protocols. In addition, the technique permits client processes to reduce the frequency with which they poll the server processes. This, in turn, dramatically reduces the burden on the server process imposed by such polling.

A client process first allocates a reception object at which the notifications will be received. Examples of a reception object include, but are not limited to, a port configured to receive data according to a low level datagram protocol such as TCP/IP UDP (transfer control protocol/internet protocol user datagram protocol), IPX, or any NetBIOS compatible network transport. In a system in which the client process and the server process are running on the same computer, the reception object may be a region of shared memory.

After allocating the reception object, the client process sends a distributed notification RPC request to the server process. The RPC request identifies the reception object and a low level protocol associated therewith (e.g., a datagram protocol) and indicates that the reception object will be used for distributed notification. The server process saves the identity of the reception object and its associated protocol. Thereafter, the server process sends notifications to the reception object using the low level protocol associated with the reception object. The server process does not verify that the reception object is accessible prior to sending notifications to the reception object.

Implementations of the technique may include one or more of the following features. The client process may respond to the notification using a request-response protocol such as the RPC protocol. The technique may include having the client process use the request-response protocol to poll the server process to determine whether activities that affect the client process have occurred at the server process. The technique also may include setting a frequency at which the client process polls the server process to a relatively low value when the step of establishing a notification connection is successful, and setting a frequency at which the client process polls the server process to a relatively high value when the step of establishing a notification connection is unsuccessful. Thus, normal polling operations provide a fall back position when distributed notification is unavailable or when a datagram is lost prior to reception by the client process.

The server process may be located on a server computer and the client process may be located on a client computer. The server computer may be connected to the client computer by a network, and the reception object may be a UDP socket, an IPX socket or a NetBIOS name. The reception object also may be a shared memory region, and the client process and the server process may be located on a common computer.

The technique may be implemented in hardware or software, or a combination of both. Preferably, the technique is implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other features and advantages will become apparent from the following description, including the drawings, and from the claims.

DESCRIPTION OF THE PREFERRED EMBODIMENTS

Figure 1:
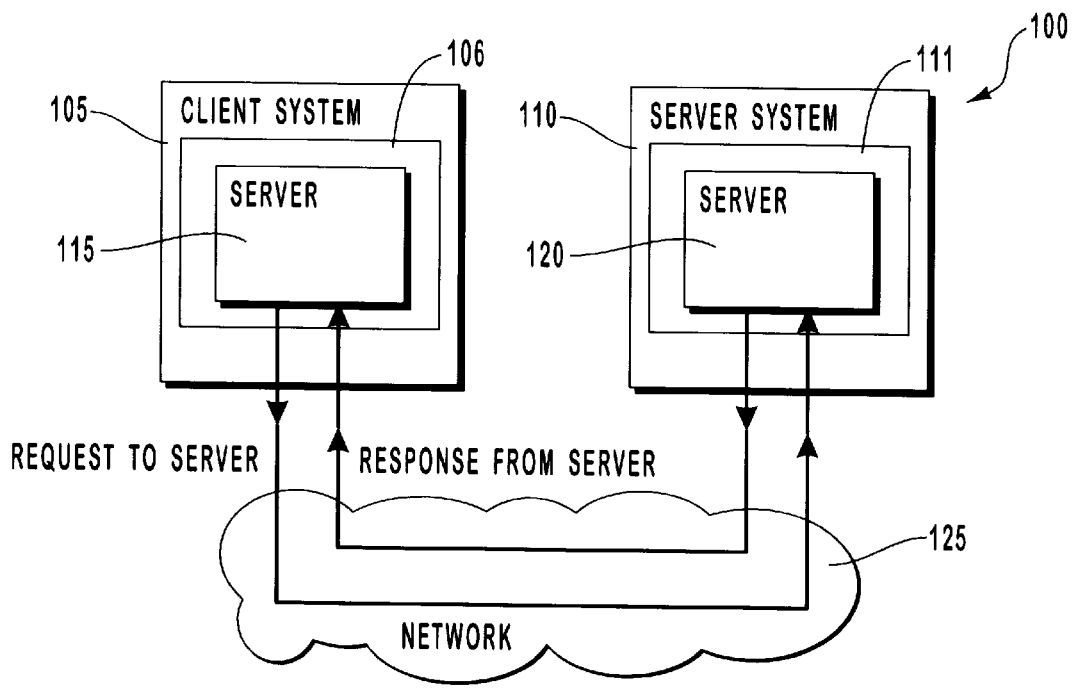
FIGS. 1–3 are block diagrams of distributed client-server computer systems.

FIG. 1 illustrates a distributed computing system 100 that includes a client system 105 having a computer readable medium 106, as for example any memory storage medium for storing and running the program code for a client process 115 as more fully described below, and a server system 110 having a computer readable medium 111 for storing the program code server system, client process, as for example any electronic storage medium capable of storing and running the server process 120 as hereinafter more fully described. A client process 115 runs on the client system and a server process 120 runs on the server system. The client process 115 communicates with the server process 120 over a network 125.

Figure 2:
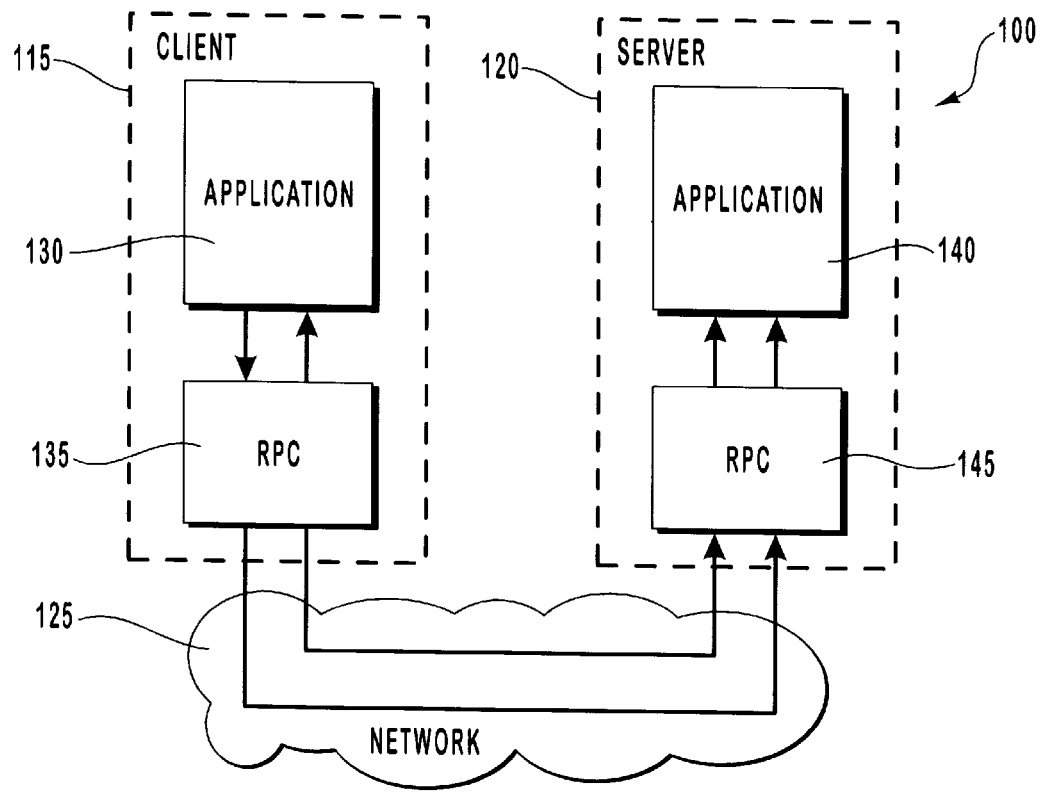

As shown in FIG. 2, the client process 115 includes application code 130 that provides functionality to a user. The application code 130 communicates with the server process 120 by making remote procedure calls ("RPCs") to the server process.

Client RPC software 135 is positioned beneath the application code 130. The client RPC software 135 receives RPCs from the application code 130 and sends them to the server process 120 over the network 125. Client RPC software 135 may be implemented using a standard RPC runtime library. The runtime library includes procedures that convert a request from the RPC handler software to an appropriate format for transmission to the server system 110 and transmit the converted request over the network 125. The runtime library also includes procedures that provide data integrity, data security and a transmission protocol appropriate for the network 125.

The server process 120 similarly includes application code 140 and server RPC software 145. The server RPC software 145, which also may be implemented using a standard RPC runtime library, includes procedures that format requests received from the client RPC software 135 and pass the requests to the application code 140. The RPC software 145 may be identical to the RPC software 135.

The application code 140 performs the procedure requested in the call and returns the results, if any, to the server RPC software 145. The server RPC software 145 transmits the results to the client process 115 over the network 125.

Figure 3:
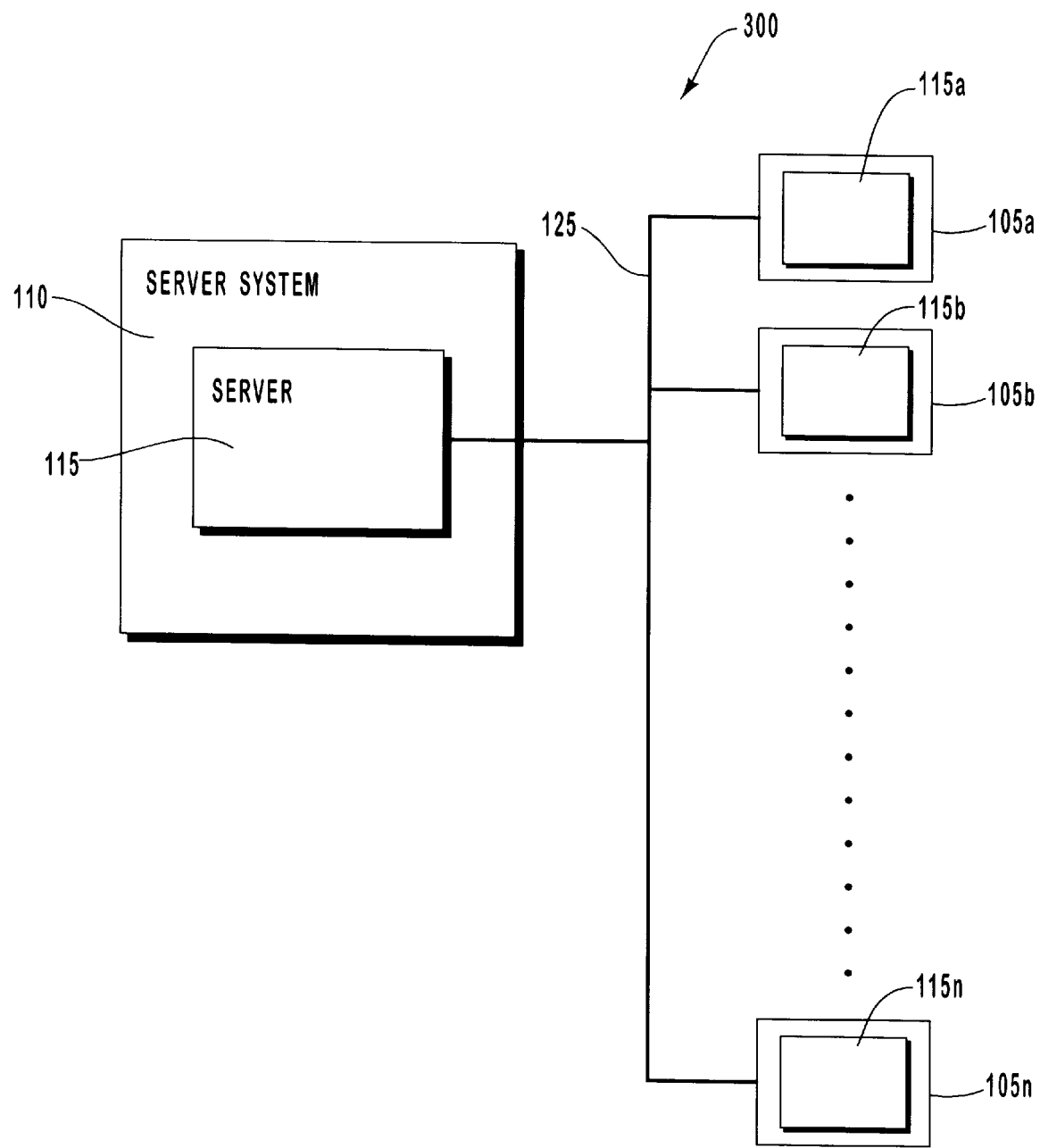

As shown in FIG. 3, a computer system 300 may include a large number of client systems 105a–105n. A client process 115 running on each client system communicates with a server process 115 running on a server system 110.

The client processes may need to make periodic status inquiries to the server process 115. For example, if the server process 115 is an electronic mail server and the client processes are electronic mail processes, then each client process may poll the server process periodically to determine whether the server process has received any new mail for the client process. As noted above, a large number (e.g., 1,000) of client processes can place a considerable burden on the server process when the client processes poll the server at a high frequency (e.g., once a minute).

Figure 4:
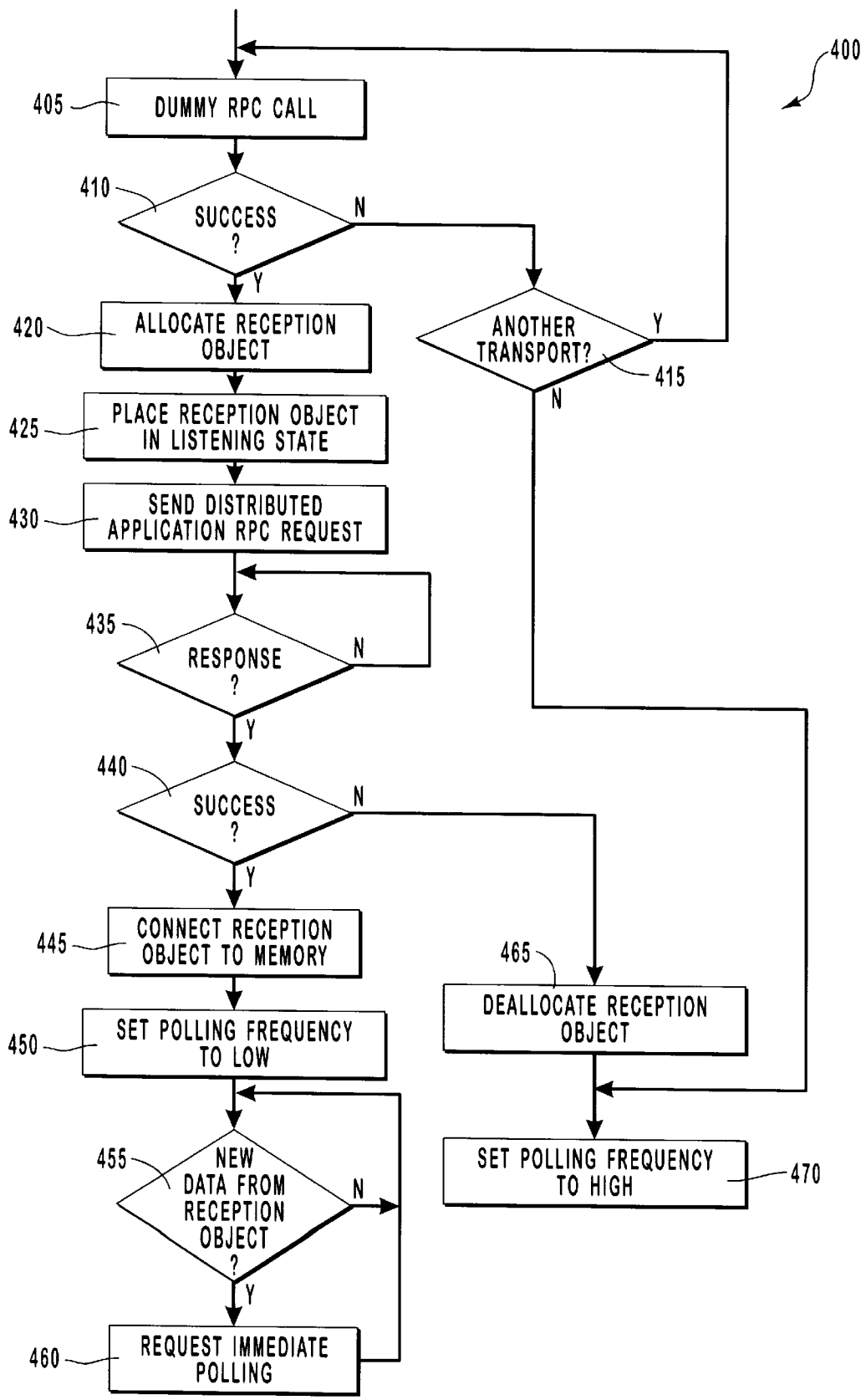
FIGS. 4 and 5 are flow charts of procedures for establishing a distributed notification connection.
Figure 5:
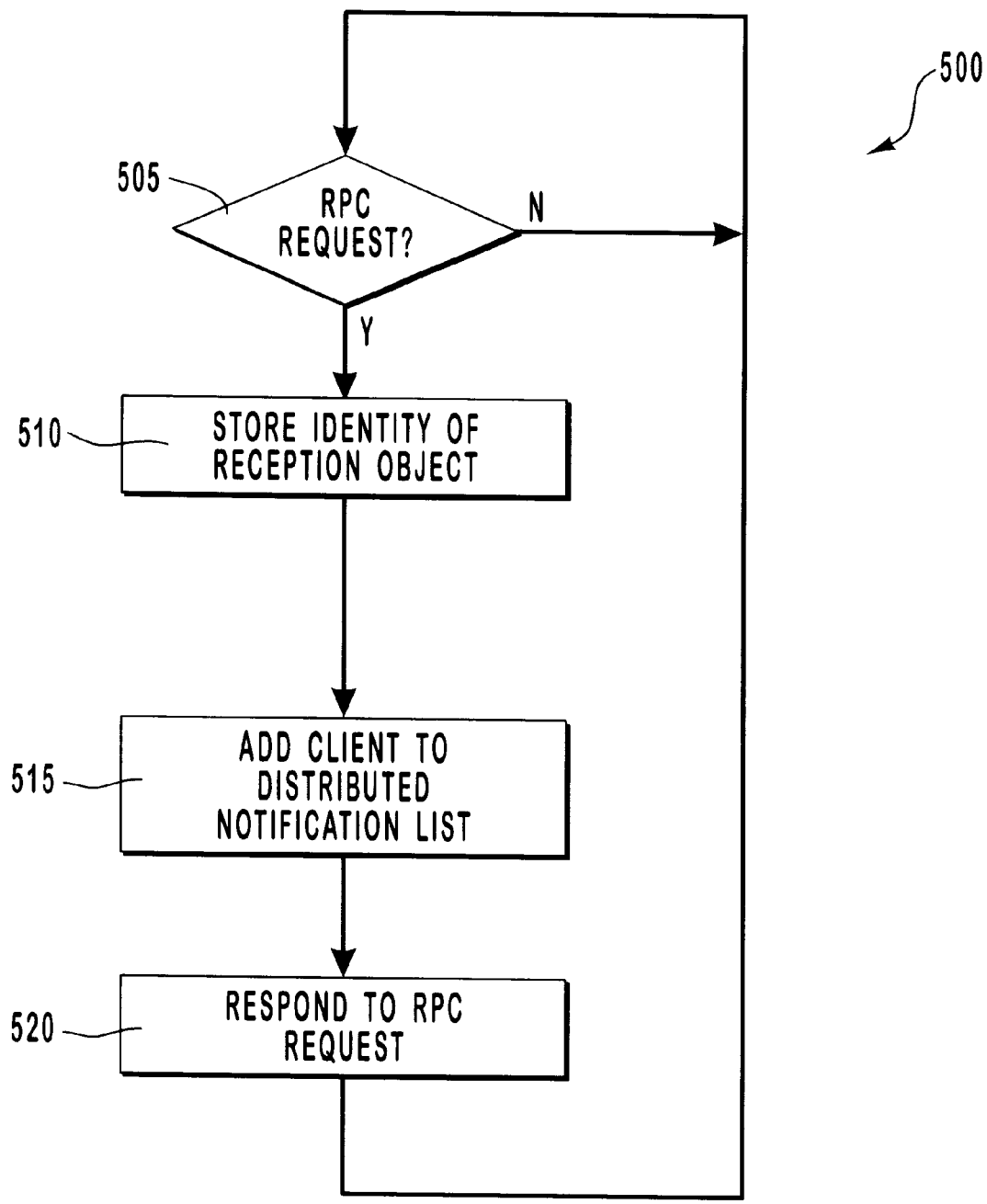

To remedy this problem, client application code 130 of each client process 115 requests distributed notification from the server application code 140 of the server process 115 using the procedure 400 illustrated in FIG. 4. The server application code 140 establishes distributed notification using the procedure 500 illustrated in FIG. 5.

The client application code 130 first determines whether connectivity to the server exists. To make this determination, the client application code may issue a RPC call to a RPC API on the server using the RPC transport that corresponds to the datagram transport to be used for distributed notification (step 405). For example, to use the TCP/IP UDP transport, the client application code would issue the RPC request using the TCP/IP transport. If the client application code already knows that there is connectivity to the server over the desired transport, then the client application code does not need to issue the RPC request.

If the RPC call succeeds (step 410), then the client application code knows that connectivity exists through the corresponding datagram transport. If the RPC call fails (step 410), and another datagram transport is available (step 415), then the client application may issue a RPC call using the RPC transport corresponding to the other datagram transport (step 405). If another datagram transport is not available, then the client application code determines that distributed notification is not available.

Figure 6A:
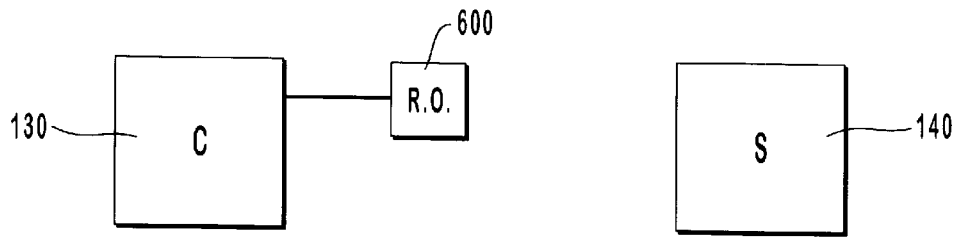
FIGS. 6A–6D are block diagrams illustrating the status of client and server processes during steps of the procedures of FIGS. 4 and 5.

Referring also to FIG. 6A, after identifying a suitable datagram transport, the client application code 130 allocates a reception object 600 (step 420). For example, if the datagram transport is TCP/IP UDP, then the client application code 130 allocates a TCP/IP UDP socket as the reception object 600. Other datagram reception mechanisms also could be used. After allocating the reception object, the client application code 130 places the reception object in a listening state in which the reception object is ready to accept datagrams (step 425).

Figure 6B:
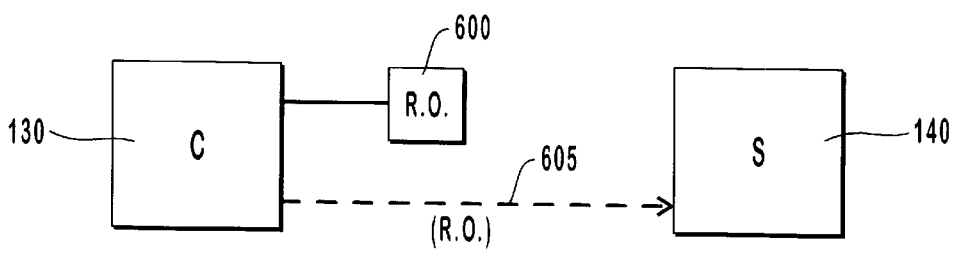

Referring also to FIG. 6B, the client application code 130 then sends a distributed notification RPC request 605 to the server application code 140 (step 430). The RPC request 605 identifies the reception object 600 and the client process 115. For example, the RPC request 605 may identify a reception object 600 that is a TCP/IP socket by providing the address of the TCP/IP socket. The RPC request also indicates that the client process wants to make a distributed notification connection. After sending the RPC request, the client application code 130 waits for a response (step 435).

Initially, the server application code 140 waits for the distributed notification RPC request 605 (step 505). It is important to note that this and other waiting states are provided only for ease of discussion. Neither the server application code nor the client application code necessarily remains idle while in a waiting state. Rather, the application codes may, and typically will, perform other operations while waiting.

Figure 6C:
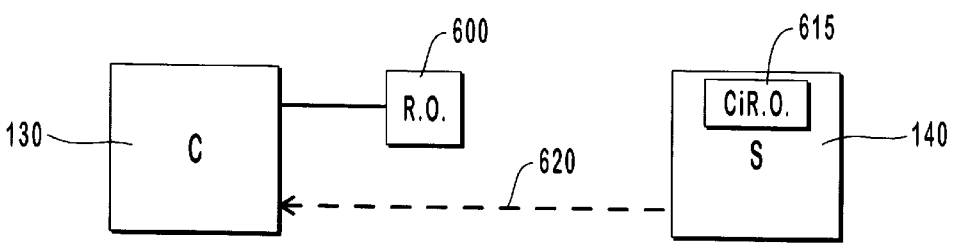

As shown in FIG. 6C, upon receiving the RPC request 605, the server application code 140 stores the identity of the reception object 600 (step 510) and adds the name of the client process 115 to a distributed notification list 615 (step 515). Since the client uses the secure RPC mechanism to provide the server with the identity of the reception object 600 and the identity of the client, the server is able to verify the identity of the client and that the client is permitted to receive notifications prior to adding the client to the distributed notification list.

As discussed below, the server application code uses the distributed notification list 615 in determining whether to send notifications to a client process. Each entry in the distributed notification list 615 includes the name of the client process and the identity of the reception object 600.

The server application code 140 indicates that the client process has been added to the distributed notification list in a response 620 to the RPC request (step 520). Thereafter, the server application code 140 waits for another distributed notification RPC request (step 505).

Figure 6D:
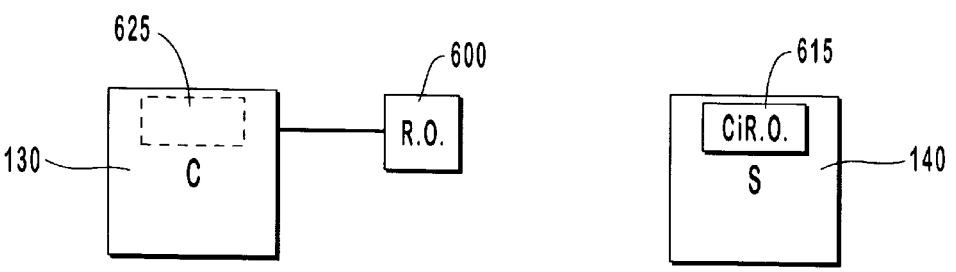

Upon receiving the response 620 to the RPC request, the client application code 130 examines the response to determine whether the request to be added to the distribution list was successful (step 440). Referring to FIG. 6D, if the request was successful, then the client application code 130 connects the reception object 600 to a region of memory 625 (step 445). The client application code 130 will place in the region of memory 625 notifications transmitted to the reception object by the server application code 140.

Next, the client application code 130 sets the frequency at which the client process will poll the server process to a low value (step 450). For example, the client application code 130 might set the polling frequency to once every ten minutes. The client continues to poll the server because there is some likelihood that a datagram will be lost or that the connection to the server will be lost.

After setting the polling frequency, the client application code waits for the reception object to receive notification from the server process (step 455). If the client application code receives a notification from the server process, the client application code requests immediate polling of the server process (step 460).

If distributed notification was not established, and a reception object was allocated, then the client application code 130 deallocates the reception object 600 (step 465). Finally, the client application code 130 sets the frequency at which the client process will poll the server process to a high value (step 470). For example, the client application code 130 might set the polling frequency to once every minute.

Figure 7:
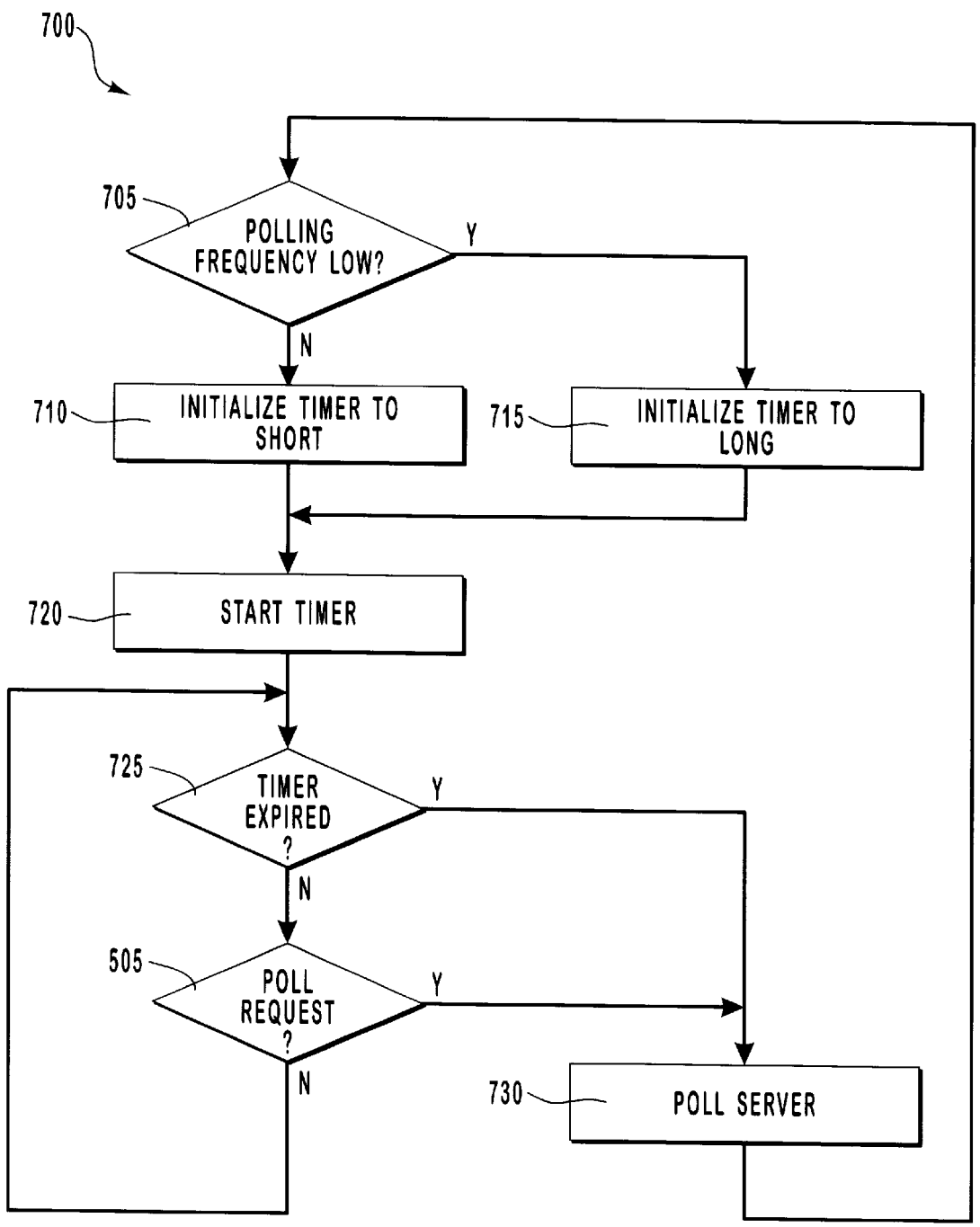
FIGS. 7 and 8 are flow charts of procedures for using a distributed notification connection.

The client process polls the server process using the procedure 700 illustrated in FIG. 7. Initially, the client process determines whether the polling frequency is set to a high value or a low value (step 705). If the frequency is set to a high value, the client process initializes a timer to a short value (step 710). Otherwise, the client process initializes the timer to a long value (step 715). For example, a short value for the timer might be one minute and a long value for the timer might be ten minutes. After initializing the timer to an appropriate value, the client process starts the timer (step 720).

When the timer expires (step 725), the client process polls the server process (step 730). For example, if the server process is an electronic mail server, the client process polls the server process to determine whether the server process needs to inform the client process of any event. For example, the server process may have new messages for the client process. Similarly, the server process may need to notify the client process that objects have changed, that a folder has been created or deleted, or that the server process has completed a search requested by the client. The client process polls the server process by sending an RPC request to the server process.

The client process also polls the server process (step 730) when an immediate poll request is generated in step 445 of procedure 400. As noted above, the immediate poll request is generated in response to a notification from the server process. After polling the server process, the client process reinitializes the timer (step 705).

Figure 8:
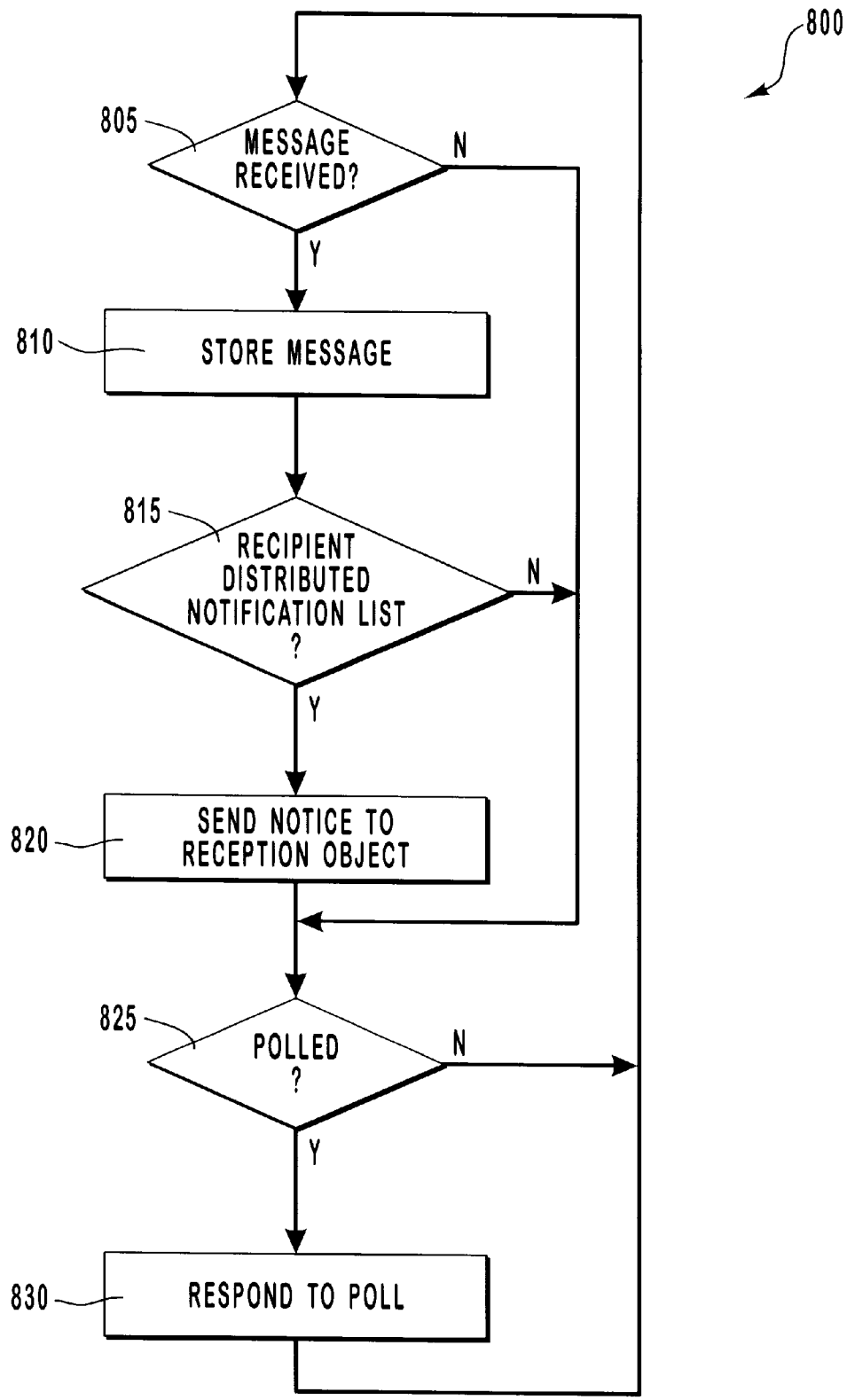

An electronic mail server process sends notifications and responds to polling according to the procedure 800 illustrated in FIG. 8. When the server process receives a message (step 805), the server process stores the message (step 810). Thereafter, if the recipient of the message is on the distributed notification list 615 (step 815), the server process sends a notification to the recipient's reception object 600 (step 820). When the communications link between the server process and the reception object 600 does not guarantee that the client process will receive the notification (e.g., when the notifications are sent using a datagram protocol), the server process periodically (e.g., once per minute) resends the message until the server process receives a polling RPC request from the client process. The server process performs similar steps in response to other events (e.g., creation of a folder or completion of a search).

After processing a received message or another event (steps 810–820) or determining that a message has not been received (step 805), the server process determines whether a polling RPC request has been received (step 825). If a polling RPC request has been received, the server process responds to the polling request (step 830). After verifying the identity of the client process that sent the polling request, the server process responds to the polling request by sending to the client process any new messages that the server process has received for the client process. The server process uses the RPC protocol to transmit the messages. Thereafter, the server process again determines whether a message has been received or another event has occurred (step 805).

Other embodiments are within the scope of the following claims. For example, the previous discussion assumes that the server process knows whether a particular client process is active. However, in some instances, the server process may not be informed when a client process disconnects or otherwise becomes inactive. To account for this situation, the server process may store with the entry for a client process in the distributed notification list the time at which the client process was added to the list. The server process also may update this time field whenever the client process polls the server process.

Use of the time entries permits the server process to remove inactive processes from the distributed notification list. In particular, the server process may remove from the list any entry for which a predetermined time period has expired since the entry was added to the list or since the time field of the entry was updated. For example, if low frequency polling is set to occur once every 10 minutes, then the server process might remove from the list any entries that have not been updated for twenty five minutes. The server process would remove entries from the list so that server resources would not be wasted in sending notifications to client processes that are no longer connected to the server process.

What is claimed is:

1. A computer-implemented method of using notifications initiated by a server process to reduce overhead associated with employing a request-response protocol in which a client process polls the server process for events that have occurred at the server process in a computer system, the method comprising:

establishing an event notification connection between the client process and the server process so that the server process notifies the client process of a designated event;

transmitting an event notification from the server process to the client process using the established event connection, and without using the request-response protocol to transmit the event notification from the server process; and the client thereafter using the request-response protocol to receive the events that have occurred at the server process in response to the event notification so that polling by the client process is reduced.

2. The method of claim 1, wherein the step of establishing a notification connection comprises:

having the client process allocate a reception object;

having the client process identify the reception object to the server process; and having the server process connect to the reception object.

3. The method of claim 2, wherein the step of transmitting notifications comprises having the server process transmit a notification to the reception object without using the request-response protocol.

4. The method of claim 3, further comprising having the client process respond to the notification by contacting the server process using the request-response protocol.

5. The method of claim 4, wherein the request-response protocol is the RPC protocol.

6. The method of claim 2, wherein:

the server process is located on a server computer;

the client process is located on a client computer; and the server computer is connected to the client computer by a network.

7. The method of claim 6, wherein the server process transmits notifications to the client process using a datagram protocol.

8. The method of claim 1, wherein:

the server process is located on a server computer;

the client process is located on a client computer; and the server computer is connected to the client computer by a network.

9. The method of claim 1, wherein the request-response protocol is the RPC protocol.

10. As an article of manufacture, a computer program product for implementing a method of using notifications initiated by a server process to reduce overhead associated with employing a request-response protocol in which a client process polls the server process for events that have occurred at the server process in a computer system, the computer program product comprising:

a computer-readable medium for carrying program code means; and program code means carried by the computer-readable medium, comprising:

program code means for establishing an event notification connection between the client process and the server process so that the server process notifies the client process of a designated event;

program code means for transmitting an event notification from the server process to the client process using the established event connection, and without using the request-response protocol to transmit the event notification from the server process; and program code means for causing the client process to thereafter use the request-response protocol to receive the events that have occurred at the server process in response to the event notification so that polling by the client process is reduced.

11. A computer-implemented method of using notifications initiated by a server process to reduce overhead associated with employing a request-response protocol in which a client process polls the server process for events that have occurred at the server process in a computer system, the method comprising:

endeavoring to establish an event notification connection between the client process and the server process so that the server process notifies the client process of a designated event and setting a frequency at which the client process polls the server process to a relatively low value when the step of establishing a notification connection is successful, and setting a frequency at which the client process polls the server process to a relatively high value when the step of establishing a notification connection is unsuccessful;

having the client process use the request-response protocol to poll the server process at the set frequency to determine whether activities that affect the client process have occurred at the server process;

transmitting an event notification from the server process to the client process using the established event connection when made, and without using the request-response protocol to transmit the event notification from the server process; and the client thereafter using the request-response protocol to receive the events that have occurred at the server process in response to the event notification so that polling by the client process is reduced.

12. As an article of manufacture, a computer program product for implementing a method of using notifications initiated by a server process to reduce overhead associated with employing a request-response protocol in which a client process polls the server process for events that have occurred at the server process in a computer system, the computer program product comprising:

a computer-readable medium for carrying program code means; and program code means carried by the computer-readable medium, comprising:

program code means for endeavoring to establish an event notification connection between the client process and the server process so that the server process notifies the client process of a designated event, and setting a frequency at which the client process polls the server process to a relatively low value when the step of establishing a notification connection is successful, and setting a frequency at which the client process polls the server process to a relatively high value when the step of establishing a notification connection is unsuccessful;

program code means for having the client process use the request-response protocol to poll the server process at the set frequency to determine whether activities that affect the client process have occurred at the server process;

program code means for transmitting an event notification from the server process to the client process using the established event connection when made, and without using the request-response protocol to transmit the event notification from the server process; and program code means for causing the client process to thereafter use the request-response protocol to receive the events that have occurred at the server process in response to the event notification so that polling by the client process is reduced.

\* \* \* \* \*